US007809801B1

(12) United States Patent
Wang et al.

(10) Patent No.: US 7,809,801 B1
(45) Date of Patent: Oct. 5, 2010

(54) METHOD AND SYSTEM FOR KEYWORD SELECTION BASED ON PROXIMITY IN NETWORK TRAILS

(75) Inventors: Jiong Wang, Union City, CA (US);
Colin Saunders, Menlo Park, CA (US);
Christopher Scofield, Seattle, WA (US);
Elmore Pope, Sammamish, WA (US);
Brad Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 475 days.

(21) Appl. No.: 11/541,042

(22) Filed: Sep. 29, 2006

Related U.S. Application Data

(63) Continuation-in-part of application No. 11/479,225, filed on Jun. 30, 2006.

(51) Int. Cl.
*G06F 15/16* (2006.01)
(52) U.S. Cl. ..................................... 709/217
(58) Field of Classification Search .............. 709/217, 709/235
See application file for complete search history.

(56) References Cited

U.S. PATENT DOCUMENTS

| | | | |
|---|---|---|---|
| 6,006,197 A | 12/1999 | d'Eon et al. | |
| 6,101,503 A | 8/2000 | Cooper et al. | |
| 6,185,614 B1 | 2/2001 | Cuomo | |
| 6,285,987 B1 | 9/2001 | Roth et al. | |
| 6,457,047 B1 * | 9/2002 | Chandra et al. | 709/217 |
| 6,714,975 B1 | 3/2004 | Aggarwal et al. | |
| 6,718,365 B1 | 4/2004 | Dutta | |
| 6,804,659 B1 | 10/2004 | Graham et al. | |
| 6,832,253 B1 * | 12/2004 | Auerbach | 709/226 |
| 6,839,681 B1 | 1/2005 | Hotz | |
| 6,978,263 B2 | 12/2005 | Soulanille | |
| 2002/0052925 A1 | 5/2002 | Kim et al. | |
| 2003/0046389 A1 | 3/2003 | Thieme | |
| 2004/0009815 A1 * | 1/2004 | Zotto et al. | 463/42 |
| 2004/0039733 A1 * | 2/2004 | Soulanille | 707/3 |
| 2004/0088360 A1 * | 5/2004 | Caughey | 709/206 |
| 2004/0088369 A1 * | 5/2004 | Yeager et al. | 709/217 |
| 2004/0267725 A1 | 12/2004 | Harik | |
| 2006/0074910 A1 | 4/2006 | Yun et al. | |

(Continued)

OTHER PUBLICATIONS

Sule Gunduz, et al., A Web Page Prediction Model Based on Click-Stream Tree Representation of User Behavior, Proceedings of the 9th ACM SIGKDD International Conference on Knowledge Discovery and Data Mining KDD '03 ACM Press, 6 pages.

*Primary Examiner*—Wing F Chan
*Assistant Examiner*—Tesfay Yohannes
(74) *Attorney, Agent, or Firm*—Robert C Kowert; Meyertons, Hood, Kivlin, Kowert & Goetzel, P.C.

(57) ABSTRACT

Users who visit a network site typically visit other sites in the same session. The surfing pattern or "trail" through the pages may be significant once aggregated, because it outlines the underlining relationship between those pages or sites. Once such user navigational trail data is available, the relationship between network sites on such user trails may used to make various decisions regarding advertising and keyword management. Additionally, the relative popularity of each trail may be used to rank or compute relative weights for the various user trails. Such information may then aid in keyword suggestion and advertising decisions.

43 Claims, 8 Drawing Sheets

U.S. PATENT DOCUMENTS

2006/0168001 A1* 7/2006 Lasater et al. ............... 709/205
2007/0233836 A1* 10/2007 Biazetti et al. .............. 709/223
2008/0059189 A1* 3/2008 Stephens .................... 704/258

* cited by examiner rank proximate network sites according to the amount of user traffic navigating to a particular network site from each of the proximate network sites
700 determine advertising pricing for placing online advertising content on one of the proximate network sites according to the ranking of each proximte network site
720

*FIG. 7*

METHOD AND SYSTEM FOR KEYWORD SELECTION BASED ON PROXIMITY IN NETWORK TRAILS

BACKGROUND OF THE INVENTION

This application is a Continuation-In-Part of U.S. patent application Ser. No. 11/479,225 titled "Method and System for Associating Search Keywords with Interest Spaces," filed Jun. 30, 2006, whose inventors are Christopher L. Scofield, Elmore Eugene Pope and Brad E. Marshall, and which is herein incorporated by reference in its entirety

FIELD OF THE INVENTION

This invention relates to computing systems and, more particularly, to suggesting keywords based on user navigational path information.

DESCRIPTION OF THE RELATED ART

As the reach and accessibility of computer networks such as the Internet increase, the amount of information accessible via such networks has grown exponentially. For example, as commercial enterprises increasingly embrace electronic commerce techniques, numerous web sites offering information and purchasing opportunities for various products and services have appeared. Major media outlets commonly provide web-based versions of content previously available only through print or broadcast channels, and in some instances generate considerable volumes of content exclusively for web-based distribution. The reduction of cost, complexity and other barriers to entry into web-based content publishing has also facilitated the generation and dissemination of content by individual creators.

As the amount of online content increases, the difficulty of locating content that is of general or specific interest also increases. Unlike libraries, which may employ standardized systems of content classification such as the Library of Congress System or the Dewey Decimal System, no standard for organizing and representing web-based content exists. Numerous search engines have evolved to attempt to index web pages according to the page contents (e.g., as given by the textual content actually displayed by the page when loaded into a browser or client, or by concealed metadata such as tags associated with, or embedded within, the page). Such search engines have further attempted to qualify the relevance of a given indexed page using other features of the page, such as its age and/or the number of links to the given indexed page from other indexed pages. For example, for a given keyword search, a page that satisfies the search criteria and is linked to from many sources may be considered a more relevant search result than a page having fewer external references.

In order to successfully draw Internet users to their web sites, publishers or advertisers frequently associate their content with particular keywords so that search engines display a particular web site or URL as part of the result of a user search including those keywords. Search engines frequently allow advertisers to bid on keywords and display the web page for an advertiser that placed a higher bid higher up on the display list. Thus, advertisers that are willing to pay more money to be associated with a particular keyword may receive more prominent display among the results of a user's search. Thus, the selection of relevant and accurate keywords by advertisers is increasingly important.

Similarly, the decision of where to place online advertisements, such as on what web pages, is also increasingly complicated due to the high demand for advertising on popular web sites. Additionally, advertisers must typically pay more to advertise on more popular web pages. In other words, an advertiser may have to pay more to advertise on a web site that receives a lot of Internet traffic.

SUMMARY

Users who visit a network site typically visit other sites in the same session. The surfing pattern or "trail" through the pages may be significant, because it outlines the underlining relationship between those pages or sites. Once such user navigational path data is available, the relationship between network sites on such user trails may be used to make various decisions regarding advertising and keyword management. Additionally, various criteria about the trails, such as the relative popularity of each trail, may be used to rank or compute relative weights for the user trails. Such information may then aid in keyword suggestion and advertising decisions.

For example, when a client seeks to publish advertisements for a network site, the client may need to select keywords for matching and serving the advertisements and provide a list of keywords to an advertisement broker. Since, as noted above, user network path or trail information may indicate that users navigate from certain network site to or from the particular network site to be advertised, the list of keywords used by those sites near, or proximate, the particular site to be advertised may be appropriate to associate with the advertised site. Thus, user navigational trail information may be useful for suggesting keywords the client may associate with the advertised network site.

For instance, suppose the users that go to client site "C" often navigate from sites "X" and "Y", to site "C" and then go on to "Z". They keywords associated with sites "X", "Y", and "Z" might be relevant to "C" and therefore may be suggested to the publisher of the site "C" as potential advertising related keywords.

BRIEF DESCRIPTION OF THE DRAWINGS

FIG. 7 is a flowchart illustrating one embodiment of a method for determining advertising pricing as described herein.

Figure 1:
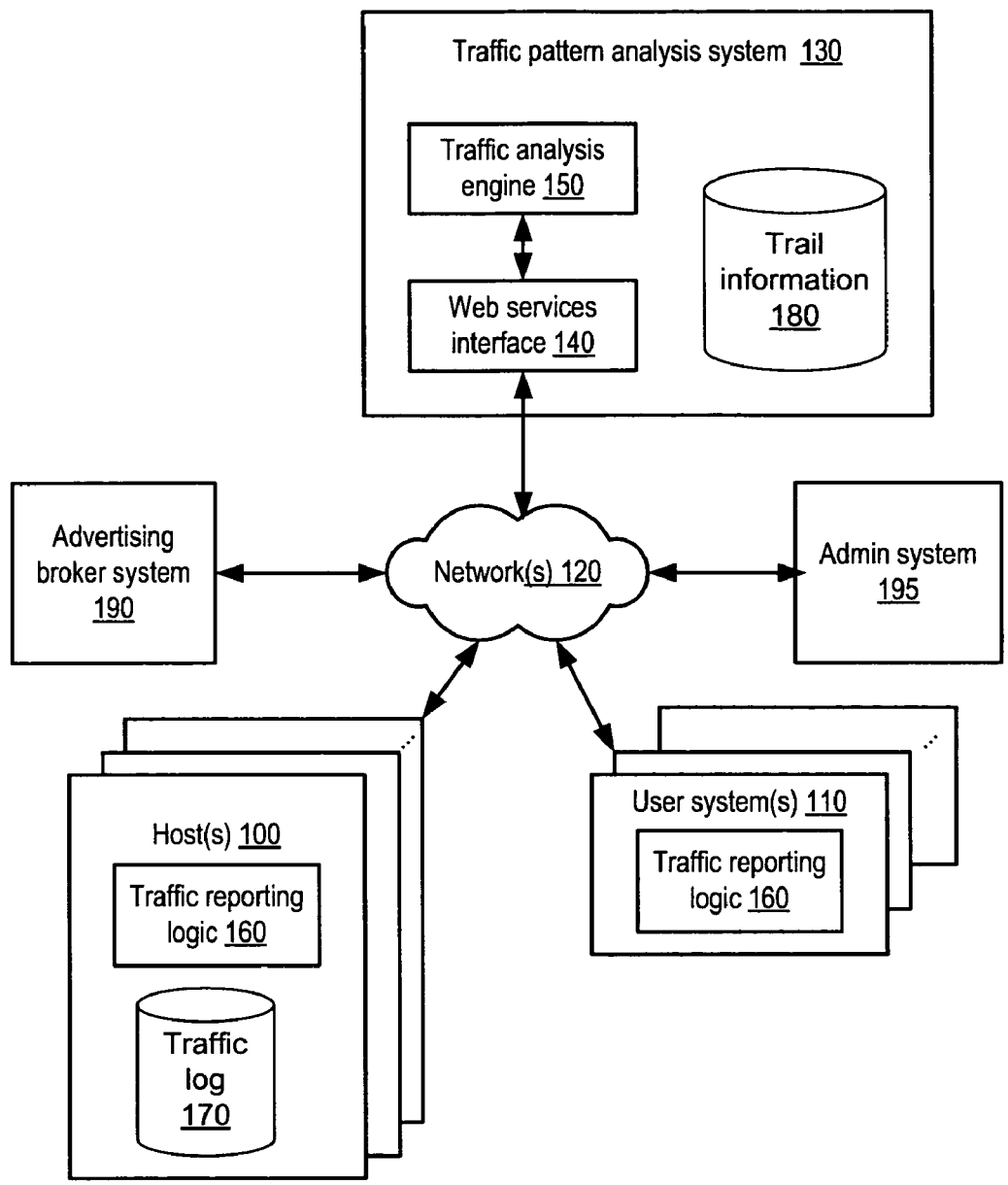
FIG. 1 is block diagram illustrating various networked computer systems capable of implementing advertising keyword selection and/or advertisement placement based on network traffic patterns or user trails, as described herein and according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Navigational path information regarding user navigation between and among network sites or other network resources may be analyzed to determine user trails or navigational paths between and among network sites, such as web sites or other network resources. Such user trails may be used to aid in various types of advertising decisions, such as selecting keywords to associate with a site or to determine where to place advertisements for a network site, according to various embodiments. Network traffic patterns, such as the order in which users navigate among network sites may be collected, such as by users' web browsers and/or network site hosts, and may be aggregated over time. For example, a search toolbar or other browser plug-in may be installed in a web browser and may be configured to collect user trail, navigational path, or other network traffic pattern information, according to some embodiments. In another embodiment, user navigational activity may be recorded in a user log that may subsequently be analyzed to determine network traffic patterns or user trails.

For example, in some embodiments, the publisher of a particular network site may determine one or more other sites from which users access the particular network site. For instance, a site S1 may be frequently accessed from a link on a site S2. Thus, a user trail may be considered to exist from site S2 to S1. Advertisers and other entities may utilize information regarding such traffic patterns, or user trails, when making decisions regarding advertising. For example, analysis of network paths may determine that a large number of users access site S2 prior to accessing site S1. Thus, placing an advertisement for site S1 on site S2 may increase the visibility of site S1. Similarly, associating keywords related to site S2 with site S1 may increase the visibility of site S1 to user searches. In other words, by determining user trails through and among various sites and by relating those sites, such as by associating or placing advertising content or associating common keywords with the site, advertisers and other network entities may take advantage of users' network activity.

When users access two sites, the keywords or search query terms that surface one of the sites to users may also work to surface the other site. For example, two network sites may only be related by the fact that a high number of users may have accessed both sites. For instance, analysis of network path and/or network user trail information may determine that a high number of users that visit a particular luxury car site also visit sites related to other luxury items, such as wine related sites. Thus, a wine distributor may associate a wine related site with keywords regarding luxury cars in order to attract more users. Similarly, the wine distributor may also pay to place advertising for the wine related site on the luxury car site.

While described herein mainly by use of the terms "site", "network site", or "web page", please note that network navigational pattern information, paths, and user trails, may also include other network resources, such as databases, file systems, or other types of data repositories accessible by protocols other than network-based protocols. The term "site" as used herein may, in various embodiments, refer to an entire network domain, a particular network site, web page, or even a particular portion of a site or web page. Also, the terms "network pattern", "navigational path" and "user trail" may used synonymously and interchangeably herein. Additionally, varying levels or granularity of network pattern information, navigational paths, and user trails may also be collected, analyzed, and utilized as part of keyword suggestion and/or advertising decisions, as described herein. For example, in one embodiment, a navigational path or user trail may indicate how a user (or users) visited various network domains. In other embodiments, network pattern information may indicate how users visited individual network sites, web pages, network resources or even specific locations on network sites or web pages.

An advertising broker or search engine may analyze or navigational path information in order to suggest keywords to potential customers. Advertisers frequently pay for particular keywords in order to have their advertising content be part of the results displayed by a search engine when users use those keywords as search query terms. The search engine provider may analyze network traffic patterns and/or user network path information in order to suggest different or better keywords to potential advertisers. For example, if user trail information indicates that a high number of users access site S2 from site S1, the search engine provider may suggest keywords related to site S2 to the provider of site S1. Similarly, if user trail information analysis indicates that a high number of users access site S3 from site S2, keywords related to, or associated with, site S3 may be suggested as keywords for site S2.

Additionally, advertisers may utilize user trail analysis to determine the network site on which to place advertising content. For example, an advertiser may associate advertising content for site S2 with site S1 if user trail analysis indicates that sites S1 and S2 are "near" or "proximate" each other according to user trail analysis. In some embodiments, two sites may be considered near each other if users access both sites within a short amount of time or if users access one site from the other, even if the users also access a number of sites in between. Please note that in some embodiments, users do not have to follow or use explicit links on a site in order to generate a user trail. For example, a user may access various sites by explicitly typing in various URLs and still generate a user trail or navigational path. In general, a user trail may be generated by a user accessing a number of network sites in a particular order. The trails of a number of users may be aggregated, such as over time, and analyzed to determine traffic patterns or aggregated navigational paths. Analysis of such traffic patterns and user trail information may determine that certain sites are more popular than others and that a high number of users access a particular site from another site or that a high number of users access a certain set of sites as a group. In other words, two sites that are otherwise unrelated may both be accessed by a high number of common users.

According to various embodiments, "associating advertising content" may represent any of various ways of advertising, linking or referring to a particular site. For example, in one embodiment, a banner advertisement may be placed on a web page. In another embodiment, a descriptive link may be placed in a list of links on a query search results page. In yet other embodiments, associating advertising content may include inserting textual and/or graphical advertising content into the contents of a site, configuring an anchor link on a site, or inserting a "Trackback" link on a weblog site. In some embodiments, a TrackBack link may be a particular linking feature, frequently used in weblogs, allowing a particular site to be notified when a link to that particular site is included on another site.

In some embodiments, analysis of user trail information may indicate that more users access a first network site from a second network site than access the first network site from a third network site. For example, more users may access site S1 from site S2 than access site S1 from site S3. Thus, the publisher of site S1 may place advertising for site S1 on site S2 in order to have the advertising viewed by more users, according to one embodiment. In another embodiment, however, the publisher may place advertising content for site S1 on site S3 in order to generate more traffic from site S3 to site S1. Also, an advertiser may pay more to ensure more prominent display of advertising content on sites that are more proximate the advertised site than on sites that are less proximate. For example, an advertisement may be placed higher up in a list of advertisements based on how proximate the advertised site is to the site on which the ad is placed. Similarly, the cost of placing the advertisement on a more proximate site may be more expensive than placing the advertisement on a less proximate site.

Similarly, if more users access site S1 from site S2 than access site S1 from site S3, keywords related to site S2 may be associated with site S1 to attempt to generate more visibility, such as in search engine results, for site 51. Additionally, an advertiser may pay more for keywords associated with a network site that is near or proximate an advertised site when selecting keywords to associate with the advertised site.

Additionally, the cost for placing advertising content may vary according to where on a site the advertising content is placed. For example, it may cost more to place an advertisement higher up on a displayed web page, according to some embodiments. Similarly, including a link for a particular network site higher up in a list of links, such as may be included in search results, may cost more than including the link lower down in the list. Additionally, in one embodiment, placing an advertisement for a particular network site spatially near a link used to access the particular site may be more expensive than placing the advertisement somewhere else on the same site. In another embodiment, however, placing the advertisement near a link to the advertised site may be less expensive than placing the advertisement near the top of a site. In general, the cost of associating advertising content with a network site may vary with the prominence of the advertising content and an advertiser may be willing to pay more to associate advertising content with sites that are in closer proximity to the advertised network site (or other advertised resource).

Please note that a cost for associating both keyword and advertising content with a network site may be described herein as dependent or related to various aspects or criteria regarding network navigational path or user trail information. In some embodiments, other factors unrelated to network navigational path or user trail information may also be used when determining advertising cost for keywords and/or advertising content.

FIG. 1 is block diagram illustrating various networked computer systems capable of implementing keyword selection and/or advertisement placement based on network traffic patterns or user trails, as described herein and according to one embodiment. As illustrated in FIG. 1, a number of hosts 100 may be configured to publish or host content, web pages or other network resources and/or content. Additionally, a traffic pattern analysis system 130 including a web services (WS) interface 140 and a traffic analysis (TA) engine 150 may be configured to communicate with hosts 100 via network 120. In some embodiments some or all of the components illustrated in FIG. 1 may be partially or entirely implemented as computer-executable instructions and data stored via a computer-accessible medium.

Generally speaking, hosts 100 may be instances of network content sources, where a network content source may encompass any suitable type of data that may be conveyed over a network, including but not limited to text documents, still image data, page image data, audio data, video data, metadata such as markup language tags, communication protocol data such as content preambles/epilogues, computer code, and so forth. In many embodiments, hosts 100 may be configured to provide content to user systems 110 via network-based data request and transport protocols. For example, hosts 100 may be configured to host network sites implementing Uniform Resource Identifiers (URIs), such as may correspond to web pages, documents or other content, and to receive requests for access to particular URIs formatted in a version of the Hypertext Transport Protocol (HTTP) data transport protocol. In response to such requests, hosts 100 may be configured to access the content corresponding to the requested URI and to provide it to the user system 110 in accordance with the HTTP protocol. It is contemplated that in some embodiments, application layer data transport protocols other than or in addition to HTTP may be used to convey requests for content and the resulting content to and from hosts 100. For example, a secure, authenticated version of HTTP may be employed, as may a version of File Transfer Protocol (FTP) or any other suitable protocol. Hereinafter, a content source may be referred to simply as a content source, although it is understood that the content of a content source may be conveyed or accessed via some type of communication network.

In some embodiments, a given host 100 may be configured as a self-contained, standalone web server that both stores content and receives and processes requests for stored content. In other embodiments, a given host 100 may be included within a complex content server architecture. For example, host 100 may be configured as an application or content server that does not actually store content, but is instead configured to retrieve requested content from a database or other repository (not shown) that may not be directly connected to network 120.

User systems 110 in general may encompass any device, system or software application that may be configured to request and/or view network content. For example, a user system 110 may include a general purpose computing system configured to implement a web browser such as a version of Microsoft® Internet Explorer®, Firefox®, Opera™, or another suitable web browser or client application. User system 110 may also include functionality defined by scripts, such as JavaScript modules, configured to execute in a standalone environment or an execution environment provided by a web browser. User system 110 may alternatively be configured to host a syndicated content aggregator that may use a publish/subscribe protocol such as RSS to notify users of the existence of new or updated content. In some embodiments, a user system 110 may include mobile devices such as cellular phone or wireless devices configured to request content via embedded clients. A user system 110 may further encompass other types of network-attached devices such as television set-top boxes, digital video recorders, electronic book readers, etc.

Network(s) 120 may include any suitable data network or combination of networks configured for communicating content requests and content between users systems 110 and hosts 100. For example, network 120 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 120 may encompass the network infrastructure commonly referred to as the Internet. In other embodiments, network 120 may be entirely contained within an enterprise and not directly accessible from the Internet. For example, network 120 may be configured as an enterprise intranet where hosts 100 and user systems 110 are local to an enterprise.

While content hosted by hosts 100 may often conform to a web-based model in which content may be requested via URIs and delivered to a web browser or other web client, this is not a requirement for the methods and techniques described herein. Broadly speaking, hosts 100 may host any type of network content and may interact with user systems 110 according to any suitable request/response model to provide the hosted content. For example, in some embodiments, hosts 100 may be configured as databases, file systems, or other types of data repositories accessible by protocols other than network-based protocols.

Generally speaking, user systems 110 may request and receive content from hosts 100 via network 120. In some instances, the pattern of such requests may indicate users' navigation between and among network sites and may represent a path or trail among various network sites or other content locations. In some embodiments, the traffic pattern and resultant trails of many different users may be aggregated over time to determine aggregated pattern or trail information. For example, if many different user systems 110 navigate from one site to another site, a pattern or trail may be considered to exist between the two sites. Similarly, if many different user systems 110 navigate from the second site to a third site, the trail may be extended from the first site to the third site via the second site. Additionally, more than one traffic pattern or trail may exist between or among a set of sites. For instance, using the same three sites mentioned above, one trail may exists from the first site to the second site and on to the third site, while another trail may exist from the first site to the third site without passing through the second site, indicating that some users, via users systems 110, navigate from the first site to the third site without visiting or accessing the second site.

In some embodiments, network sites that are accessed by users in close proximity to another site may be considered near or proximate the other site. For example, when navigational pattern information indicates that users navigate from a first site to a second site and then on to a third site, the three sites may be considered "near" or "proximate" each other. In one embodiment, the first site may be considered nearer, or more proximate, the second site than the third site and the third site may be considered nearer, or more proximate, the second site than the first site.

Various criteria may be used to determine whether one network site is proximate another site or to determine whether one site is more proximate than another site to a third site, according to different embodiments. In another words, a level of proximity may be determined for various network sites in relation to a particular site. For example, in one embodiment, the number of sites between two network sites may be used a measure of whether one site is proximate another. Thus, a given number of hops (e.g., number of steps or links in a network path or user trail) between two sites may determine whether the two sites are proximate. Additionally, the number of hops between two sites may correspond to a level of proximity between the two sites. In another embodiment, the number of users that travel a particular path or trail or the number of users that visit two sites, whether or not every user follows the same path between the sites, may determine whether the two sites are proximate. In yet another embodiment, the amount of time between when users access two sites may be used as a criterion to determine how proximate the two sites are.

Additionally, user quality, or aggregate user quality, may be used to determine the proximity of sites. For instance, the average or aggregate quality of all users that visit two sites may be used to determine whether the two sites are proximate. User quality may be determined in various manners. For example, user profile information may be used to determine how likely a user is to purchase a particular type of product or service. Those users determined to be more likely to make a purchase may be considered of higher quality for determining the proximity of two sites visited by those users. Similarly information regarding other sites visited by users, users' geographic location, occupation, etc. may be used, at least in part, to determine a user quality. Thus, a site visited by users of higher average quality may be considered to be more proximate to a particular site than a site visited by users by lower quality.

A number of sites may be ranked according to any such criteria to determine each site's relative proximity or nearness to a particular site, according to some embodiments. For example, the respective number of hops between each of various network sites and a particular network site may be used to determine a level of proximity for each of the sites, thus ranking the sites by their respective proximity to the particular site. Similarly, the amount of time, either average or aggregate, between users accessing each of various proximate sites and accessing a particular site may correspond to a level of proximity for each of the various proximate sites and therefore may be used to rank each of the various proximate sites by their respective proximity to the particular site. In general, any criterion or criteria used to determine whether a first site is proximate to another site may also be used to determine a level of proximity for the first site and may also be used to rank various sites according to their respective proximity to the particular site.

Additionally, when more than one trail or path exists among various sites, the different tails may be weighted according to various techniques. For example, in one embodiment, the amount of actual traffic, e.g. the number of users, navigating along a particular path may be used to weight different user trails. Thus, a trail which more users navigate may be weighted more heavily that a trail that fewer users navigate, according to one embodiment. In another embodiment, more recently navigated trails may be weighted more heavily that trails that have not been navigated as recently.

The location of links and or the location of the target of links may also be used to rank the proximity of sites, according to some embodiments. For example, an anchor link may be considered a link that targets a specific location within a network site or within a web page. Thus, in one embodiment, only sites including anchor links to a particular network site may be considered proximate to the particular site. In another embodiment, sites that include anchor links targeting a specific location within a particular network site, such as a specific page or a specific location within a page, may be considered proximate to the particular network site. Similarly, even though several sites may all be considered proximate to a particular network site, those sites including anchor links or those including anchor links to specific locations of the particular network site may be ranked more highly or be considered to have a higher level of proximity to the particular network sites. Thus, in some embodiments, an advertiser may be willing to pay more for associating advertising content with sites that include anchor links than for associating advertising content with sites that do not include anchor links. Similarly, advertising content placed spatially near an anchor link may be more effective, and therefore may cost more, than advertising content placed elsewhere on the same site or page.

Additionally, advertising content may be tailored to match the location targeted by an anchor link, according to some embodiments. For example, if an anchor link targets a specific product description on a particular network site, advertising content regarding the particular network site may be tailored to refer to the specific product and may also be placed spatially near the anchor link targeting the specific product description.

The presence of anchor links to other sites on the same network path or user trail as a particular network site, even if those anchor links do not specifically target the particular network site, may be used when determining proximity and advertising cost. For example, sites S1, S2, S3 and S4 may all be indicated as being on the same or related user trails. Both site S1 and site S2 may be proximate site S3 and site S4 may include an anchor link to a specific location on site S1. If the user trail information indicates that more users visit sites S3 via the anchor link on site S4 to site S1 than visit site S3 via site S2, site S1 may be ranked higher in proximity to site S3 than site S2. Similarly, it may cost more to place an advertisement for site S3 on site S1 and may cost even more to place the advertisement near the target of the anchor link on site S1 than to place the advertisement on site s2.

As will be discussed below in more detail, a user or user system 110 may navigate among network sites in various manners, according to different embodiments. For example, in one embodiment, a user may navigate using explicit links in the content. For instance, the content of a first site may include an explicit link (sometimes referred as a hyperlink) to a second site. By selecting an explicit link, such as by using a mouse to click on the link, a user may navigate to the second site and the content of the second site may be requested, received and displayed by a user system 110. In other embodiments, however, a user may type in a location, such as a URI, to which to navigate. In yet other embodiments, a user may use a search engine, such as by typing in one or more search query terms, and may navigate to various sites by selecting links returned by the search engine. Thus, network traffic patterns and/or user trails may be generated by users and user systems 110 navigating among network sites using various techniques.

As described above, a host 100 may receive content request traffic from various user systems 110 that is directed to content hosted by host 100. For example, a host 100 may receive HTTP GET requests directed to a particular URI, or a different type of content request according to a different data transport protocol. In the illustrated embodiment, hosts 100 may be instrumented with traffic reporting logic 160, which in various embodiments may include scripts, code or hardwired logic configured to report content request traffic to traffic pattern analysis system 130. In other embodiments, users system 110 may be configured to report a user's traffic pattern through and among various content (e.g. web pages) to one or more hosts or other servers. For example, user system 110 may include traffic reporting logic 160, such as may be implemented by a web browser or a browser plug-in, configured to capture and report a user's navigational activity to traffic pattern analysis system 130, according to some embodiments. For example, in one embodiment, traffic reporting logic 160 may represent a browser plug-in, such a search toolbar plug-in configured to capture and/or report a user's navigational activity. In another embodiment, traffic reporting logic 160 may represent web browser functionality configured to record user navigational activity in one or more user logs that may be analyzed, such as by traffic pattern analysis system 130, to determine network patterns or user trails. Similarly, in yet another embodiment, traffic reporting logic 160 may be configured to report user navigational activity directly to traffic pattern analysis system 130, such as by reporting each site or other network resource visited by a user, as the user visits those sites or resources. Traffic pattern analysis system 130 may then analyze the reported user navigational activity and/or other network pattern information to determine network patterns or user trails.

In one embodiment, traffic reporting logic 160, whether implemented on hosts 100 or user systems 110, may be configured to invoke one or more web services (WS) calls targeting the WS interface 140 of traffic pattern analysis system 130 as the service endpoint. For example, host 100 may detect an incoming HTTP GET request specifying a given URI. In response, traffic pattern analysis system 130 may be notified of the content request traffic via a web services call and the reported request traffic may be stored, e.g., by traffic pattern analysis system 130, such as in trail information 180. Trail information 180 may represent any suitable data storage system or technique. For example, in one embodiment, trail information 180 may represent a database of navigational pattern information.

Traffic pattern analysis system 130 may, in some embodiments, be configured to store received content request traffic data using any suitable format or methodology. For example, traffic pattern analysis system 130 may store such data in arrays, tables, trees, databases, hashed structures or other suitable data structures, either internal to traffic pattern analysis system 130, such as in trail information 180, or distributed among one or several external systems (not shown) such as database systems, file systems, etc. In some embodiments, traffic pattern analysis system 130 may store historical content request traffic data for arbitrary periods of time, while in other embodiments data older than a threshold age (e.g., days, months, etc.) may be automatically purged or moved to secondary storage.

In one embodiment, traffic reporting logic 160 may be configured to issue a web services call according to the following format:

http://<endpoint>/xml?Operation=AddPheromone
      &Url=<valid URL>
    &Referrer1=<valid referrer URL>
    &Referrer2=<valid referrer URL>
    &ResponseType=<valid response type> where <endpoint> corresponds to the Internet address of WS interface 140, in name or numeric form, and where <valid URL> denotes the requested or targeted URL. In the illustrated embodiment, two referrer URLs may also be supplied. The first referrer URL may correspond to the URL from which the request for the targeted URL originated. For example, the request may have been generated by a user selecting (e.g., clicking) a link or otherwise executing a navigation operation on some other web page or network site, in which case the first referrer URL may include the URL of that other web page. Similarly, the second referrer URL may include the URL of the site, page or other resource that referred to the first referrer URL (e.g., the URL that is two links previous to the targeted URL in the navigation history of the requestor). More or fewer referrers may be provided in various embodiments. Also, additional or different parameters may be used in the web services call in various embodiments. For example, date and/or time information associated with the occurrence of the content request may be embedded by the host within the web services call used to report the content request. Alternatively, such information may be recorded by traffic pattern analysis system 130 when it receives such a report. Over time, different hosts 100 may report content request traffic indicating users' navigational patterns to traffic pattern analysis system 130 via traffic reporting logic 160. As a result, over time traffic pattern analysis system 130 may accumulate a body of data indicative of navigational traffic patterns from many different user systems 110. Such data may serve as the basis for navigation path analysis, as described herein.

It is noted that in some embodiments, when a user navigates away from content on a particular host 100 to a different content source (e.g., a URI hosted by a different host 100), the particular host 100 may be configured to detect the outgoing transition. In some such embodiments, hosts 100 may be configured to report such outgoing content request traffic to IA system 130 via traffic reporting logic 160 in addition to incoming content request traffic. Since navigation away from one content source typically implies navigation towards another, even if the target host is not instrumented to report content request traffic data (e.g., with an instance of traffic reporting logic 160), in some circumstances content request traffic data may still be captured by the host from which the user is navigating away.

Generally speaking, recording information regarding the navigational path taken by a user to a content source (e.g., the target URL as well as its referrers) may be conceptually similar to an insect marking its path with a pheromone. If a sufficient number of users navigate to a particular content source through a certain set of paths, those paths may be distinguished from other paths (e.g., random paths) via the accumulation of "pheromone" (e.g., recorded traffic information). In the example web services call shown above, the specified operation AddPheromone may indicate to traffic pattern analysis system 130 that the supplied content request traffic information should be recorded and analyzed. It is noted, however, that the use of the term "pheromone" in this context is purely illustrative or metaphorical and that some characteristics of biological pheromones may not be directly applicable to analysis of content request traffic as described herein.

It is noted that in various embodiments, traffic reporting logic 160 may be configured to invoke WS interface 140 in any of a number of suitable ways. The example above may be representative of a web services invocation in a Representational State Transfer (REST)-style web services architecture. Alternatively, host 100 may communicate with WS interface 140 using a document- or message-oriented architecture, for example by formatting the web services request as an eXtensible Markup Language (XML) document, encapsulating such a document using a version of the Simple Object Access Protocol (SOAP), and conveying the resulting encapsulated document to WS interface 140 for processing. Different numbers or types of parameters for communicating information about content request traffic targeting host 100 may be employed in various embodiments. In some embodiments, hosts 100 may communicate with interface 140 using protocols other than web services-related protocols. For example, such communication may take place using protocols such as Telnet, Remote Procedure Call (RPC), or other standard or proprietary protocols. Also, in some embodiments it is contemplated that a host 100 may combine and report information for multiple distinct content requests as part of a single web services transaction with WS interface 140.

An administrator of a host 100 may integrate traffic reporting logic 160 directly within the other functionality of host 100 that is configured to process content requests and provide content. However, in some embodiments, traffic reporting logic 160 may be configured as a self-contained, platform-independent software module that may be downloaded, remotely invoked or otherwise obtained from a third party (e.g., the party providing traffic pattern analysis system 130) and implemented by an administrator of a host 100 with minimal alteration to the configuration of host 100. For example, traffic reporting logic 160 may be implemented as a JavaScript module or a software module coded in another suitable language. Upon activation, traffic reporting logic 160 may be configured to generate the appropriate web services calls to report content request traffic to traffic pattern analysis system 130 in a manner that is generally transparent to the other operations performed by host 100. Traffic reporting logic 160 may be implemented to have minimal impact on content request throughput. For example, if traffic reporting logic 160 cannot contact WS interface 140 to report a particular content request, the request may still be allowed to complete.

Although in some embodiments, traffic reporting logic 160 may execute on host 100, in other embodiments it may be implemented as a module such as a JavaScript module that is delivered by host 100 to a user system 110 along with the requested content. Traffic reporting logic 160 may then be executed by the user system, rather than the host, in order to report the request. In other embodiments, traffic reporting logic 160 may be implemented on a proxy server that may be located between user system 110 and host 100. The general function of traffic reporting logic 160 may be similar regardless of whether the logic is implemented for host-side, client-side or proxy server execution.

Through the reporting of instances of content request traffic by hosts 100, traffic pattern analysis system 130 may gather data indicative of both the global traffic behavior among hosts 100 as well as traffic behavior relative to a subset of hosts 100 or within an individual host 100 (e.g., among the different URIs hosted by a particular host 100). In some embodiments, traffic pattern analysis system 130 may store each traffic report received from a host 100 as an individual data record, such as in trail information 180, while in other embodiments traffic pattern analysis system 130 may be configured to aggregate or consolidate traffic records in various ways. For example, traffic pattern analysis system 130 may aggregate content request traffic data into time slots according to intervals of time such as seconds, minutes, hours, days or other suitable intervals. Those data points falling within a given time slot may be aggregated for the purposes of analysis.

Additionally, advertising broker system 190 may be configured to utilize navigational traffic patterns or user trails for various advertising purposes, such as suggesting keywords for network sites, associating keywords with network sites, and/or placing advertising content on network sites. In some embodiments, advertising broker system 190 may represent a computer system that combines the hosting capabilities of a host 100 as well as the traffic pattern analysis capabilities of traffic pattern analysis system 130. For example, in one embodiment, advertising broker system 190 may host or publish a network site providing advertising opportunities and that may also collect and analyze navigational patterns and/or user trails.

As noted above, keywords associated with network sites that are nearby or proximate a particular site may be associated with the particular site. For instance, in one embodiment, admin system 195 may be utilized by the publisher of a particular site, such as a network site provided by a host 100 Admin system 195 may represent a computer system used to request aggregated navigational pattern information or to request and utilize suggested keywords based on navigational pattern information. A user of admin system 195 may desire to bid on one or more keywords, such as to have an advertisement for the provided network site be included in a search engine's results. Thus, in some embodiments, admin system 195 may communicate with advertising broker system 190 requesting one or more suggested keywords to associate with the particular network site. In response, advertising broker system 190 may be configured to communicate with traffic pattern analysis 130 to request one or more sites that are considered near or proximate the particular site.

Advertising broker 190 may additionally be configured to determine one or more keywords associated with the proximate sites. For example, advertising broker 190 may be configured to determine keywords already associated with the proximate sites, such as may be indicated in metadata of proximate sites, according to one embodiment. In one embodiment, keywords that are already associated with sites, such as might be included in an advertising broker's store of keyword associations may be used. In other words, an advertising broker may already have a set of keywords associated with various sites and thus, may use those keywords when determining keyword to potentially associate another proximate those sites. In another embodiment, advertising broker 190 may be configured to analyze the content of one or more of the proximate sites to determine keywords. In yet other embodiments, keywords may be determined from the character, tone or nature of a site. As various methods of detecting keywords associated with sites and of analyzing content to determine keywords is well known, they will not be discussed in more detail herein.

Generally speaking, navigational pattern data may be retrieved from traffic pattern analysis system 130 by an application for any suitable purpose. For example, an application or system, such as advertising broker 190, may seek to retrieve raw content traffic reports submitted to traffic pattern analysis system 130 in order to perform its own analysis. Other applications may request content interest data derived by traffic pattern analysis system 130, such as weighted user trails, a set of network sites that are proximate another site, or information on navigation paths or aggregate paths, according to various embodiments.

Navigational pattern information or user trail information may be retrieved from traffic pattern analysis system 130 according to any suitable technique. For example, in embodiments where traffic pattern analysis system 130 is configured to store records, tables or other data structures including interest data, various applications may query traffic pattern analysis system 130 via WS interface 140 to retrieve interest data for a particular content source or a number of sources.

In one embodiment, an application or system, such as advertising broker 190, may be configured to place advertisements within content based on navigational patterns and/or user trail information. For example, an advertisement may be placed on a network site based on the content of, or keywords associated with, network sites that are proximate particular site. Additionally, the cost charged for advertising placement may be based on navigational pattern or user trail information, according to some embodiments. For example, the highest rates may be charged for placement on content sources or sites that are on or associated with more popular user trails (e.g., trails that have higher traffic volume).

Similarly, the cost associated with keywords or search query terms may also be based on navigational patterns or user trail information. As noted above, frequently a search engine may allow advertisers to bid for more prominent display of their advertisement in the results provided by the search engine. For instance, in some embodiments, an advertiser may bid more for a keyword associated with sites proximate the site to be advertised. Thus, in one embodiment, the publisher of a site, such as a site provided by a host 100, may seek to advertise the published site and may utilize advertising broker 190 to determine suggested keywords associated with sites near the site to be advertised, as indicated by user trail information provided by traffic pattern analysis system 130. The publisher may then bid more for those keywords associated with proximate sites than for keywords not associated with proximate sites, according to one embodiment. In some embodiments, admin system 195 may represent a computer system used by the publisher of a site to communicate with advertising broker 190 to request keywords associated with site near the site to be advertised.

Additionally, in some embodiments, the cost of associating advertising content with a network site may vary depending upon how proximate the advertised site is to the site with which the advertising content is being associated. Similarly, when placing an advertisement, the more proximate the advertised site is to the site on which the ad is placed may determine how prominent (e.g. how high up in a list or set of advertisements) the advertisement is. Thus, the cost of placing an advertisement on a number of different sites may vary depending upon how proximate each of those sites is to the advertised site, according to some embodiments.

In some embodiments, a human administrator may use admin system 195 to communicate with advertising broker 190 to request suggested keywords, such as via a web page provided by advertising broker 190. For instance, admin system 195 may communicate a request including the URL of a network site to be advertised or of other interest, to advertising broker 190 and advertising broker 190 may communicate with traffic pattern analysis system 130 to determine one or more sites proximate the site to be advertised, as indicated by user navigational trail information. Advertising broker 190 may then determine one or more keywords associated with the proximate sites and suggest those keywords to the administrator, such as by communicating the suggested keywords to admin system 195 in a generated web page or other network content results.

In some embodiments, as noted above, advertising broker system 190 may include the traffic pattern analysis functionality of traffic pattern analysis system 130 and thus may not communicate with another system to determine network sites that are proximate a particular network site. In another embodiment, admin system 195 may be configured to communicate directly with traffic pattern analysis system 130 to obtain navigation pattern information or trail information indicating network sites that are near or proximate a particular network site, such as a network site to be advertised. Admin system 195 may then determine one or more keywords to associate with the site to be advertised and communicate with advertising broker system 190 to utilize those keywords as part of advertising the site. For example, admin system 195 may communicate with advertising broker 190 to bid on those keywords regarding placement of an advertisement in search engine results.

In other embodiments, advertising broker 190 may be configured to place advertising content on various network sites or other content, such as may be hosted by hosts 100. Additionally, admin system 195 may communicate with advertising broker system 190 to request suggested web pages on which to advertise a particular web page to be advertised. In response, advertising broker system 190 may determine one or more sites that are near or proximate the particular site along navigational patterns or user trails and suggest those proximate sites and potential locations to advertise the particular site, according to one embodiment. For instance, advertising broker 190 may be configured to request user trail information from traffic pattern analysis system 130 to determine sites that are proximate the site to be advertised. For example, sites that are on the same navigational paths or user trails as the site to be advertised may be suggested as potential locations for advertising the particular site.

In other embodiments, however, admin system 195 may be configured to communicate with traffic pattern analysis system 130 to determine sites that are proximate the site to be advertised. Thus, in some embodiments, the publisher of a site may determine one or more sites proximate a site to be advertised, while in other embodiments, the publisher may utilize advertising broker 190 to determine proximate sites. As noted above, sites that are on the same navigational patterns and/or user trails as the site to be advertised, whether visited before or after the site to be advertised (along a trail), may be considered proximate the site to be advertised.

Additionally, advertising broker 190 may also be configured to place advertising content for the particular network site on the proximate network sites, according to some embodiments. For example, in one embodiment, admin system 195 may communicate with advertising broker system 190 and request that an advertisement for a particular network site S1, be placed on a network site near site S1. In response, as described above, advertising broker 190 may determine that sites S2 and S3 are both near site S1 along one or more user trails and may place an advertisement for site S1 on sites S2 and S3.

Figure 2:
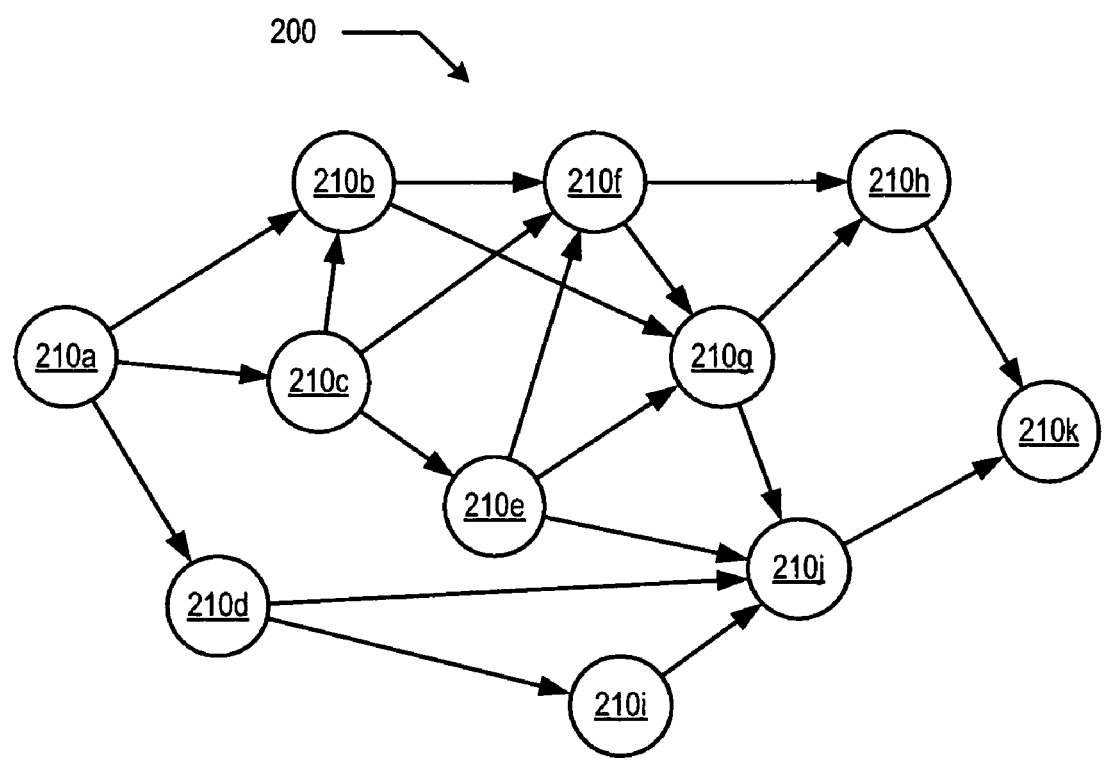
FIG. 2 illustrates one embodiment of a navigational pattern information diagram representing user navigation paths among network sites.

A user's selection or activation of a reference to a destination content source and consequent presentation of the destination content source to the user in response to the selection may be referred to as user navigation to the destination content source. Similarly, the user's act of selecting or activating the reference may be referred to as traversal of the reference. If a navigable reference directly relates two content sources, a navigation path may be said to exist between the related content sources. A sequence of paths in which the destination of one path functions as the origin of another path may be referred to as a navigational pattern or user trail. A collection of content sources (e.g. web pages or other network sites) may present a variety of navigation paths and user trails along which a user navigates from one content source to another. For example, a first content source may link to a second, which in turn links to a third, and so forth. These relationships among content sources may be represented as a network or graph, of which one embodiment is illustrated in FIG. 2.

In the illustrated embodiment, navigational pattern information 200 is shown to include a number of content sources (e.g. web pages or network sites) 210a-k. Network sites 210 may encompass, for example, any of the various types or configurations of content sources discussed previously. Paths relating different network sites 210 are shown as directional arrows between the related sources. Thus, for example, paths exist between network sites 210a and network sites 210b-d. By contrast, no direct path exists between network sites 210a and network sites 210e, although a user might navigate between these content sources via network sites 210c. In some instances, where one path exists from a first site 210 to a second (e.g., a destination) site 210, another path or paths may also exist that lead from the second network site 210 back to the first network site 210, either directly or via some other content source 310. Consequently, it is possible that cycles may exist within navigational pattern information 200, although for simplicity of exposition these are not shown in the illustrated embodiment.

It is noted that navigational pattern information 200 may represent relationships between network sites 210 at the level of content navigation. The paths shown in navigational pattern information 200 may or may not correspond to communication network relationships among systems that may be configured to host network sites 210. For example, two network sites 210 may be adjacent in navigational pattern information 200 if a user navigates from one to the other. However, the systems hosting the adjacent network sites 210, such as hosts 100, may in fact be quite distant in terms of geography or communication network topology. Conversely, systems that are close in terms of geography or communication network topology may be distant in terms of the navigation path topology of navigational pattern information 200. Thus, in some embodiments, the navigation path topology represented by navigational pattern information 200 may differ or diverge from the topology of the underlying communication software and/or hardware entities through which network sites 210 may be implemented.

It is further noted that in some embodiments, the relationships represented within navigational pattern information 200 need not be constrained to explicit navigation links (e.g., HTML links) encoded within content sources. That is, as described previously, a reference between two network sites 210 may be generated on the basis of user navigation patterns that may not involve the traversal of explicit links. In some instances a reference may be generated indirectly or obliquely by virtue of using search terms or search engine results through which another content source may be selected. Additionally, in some embodiments, a user may navigate from one network site 210 to another network site 210 by specifying a URI, such as by typing the URI into a web browser entry screen. Generally speaking, the relationships represented within navigational pattern information 200 may reflect any of the various ways in which users may navigate among network sites 210, irrespective of whether explicit navigation links are employed. Correspondingly, in some embodiments, the topology of navigation path relationships represented by navigational pattern information 200 may differ from the topology of explicit navigation links included within network sites 210 themselves, in addition to differing from the topology of lower levels of resource implementation.

In some embodiments, the user trails indicated by navigational pattern information 200 may be identified through an analysis of user requests for content. For example, as described above, content access requests including referral information may be reported to traffic pattern analysis system 130. Such requests may arise in a number of ways, such as a user selecting a link explicitly represented in another network site 210, entering a URI directly into a browser window, or in any other suitable fashion. If the reported content access request targets a valid content source, it may be indicative of a navigational path or user trail from the referring network site 210 to the requested network site 210. Correspondingly, records of reported content access requests may be analyzed to identify such paths or trails and to construct a corresponding representation of navigational pattern information 200. Such a usage-driven representation of navigational pattern information 200 may not represent every possible navigation path that exists among network sites 210. Rather, it may represent only those paths for which an actual traversal by a user has been reported.

As mentioned above, numerous navigational paths or user trails may exist within navigational pattern information 200. However, different paths may vary, sometimes substantially, with respect to various measures of path usage. In some embodiments, a representation of navigational pattern information 200 may include indications of weights along the paths between network sites 210, where the weights may reflect any suitable measure of usage or activity of the corresponding path. For example, paths between certain network sites 210 may be traversed by a high volume of different users relative to paths between other network sites 210. In one embodiment, a measure of navigation volume of a path, such as a number of path traversals per unit of time, may be assigned as a weight of that path. Alternatively, some paths through navigational pattern information 200 may exhibit a substantial rate of change relative to other paths. Correspondingly, in one embodiment a time rate of change of the number of traversals of a given path may be assigned as a weight of that path.

For a given network site 210, path weight information may be used in generating advertising or keyword recommendations from the set of network sites 210 near the given network site 210. For example, path weights may be used to rank the paths from network site 210f in decreasing order, such that network site 210b ranks highest followed by network sites 310c and 310e. Thus, when determining keywords to associate with network site 210f, those keywords associated with 210b may be suggested prior to, given more weight than, or be priced higher than, keywords associated with network sites 210c or 210e. As noted above, network sites may be proximate a particular network sites regardless of whether users navigate from the other network sites to the particular network site or from the particular network site to the other network sites. Thus, network site 210b may be considered near network sites 210a, 210c, 210e, 210f and 210g, according to one embodiment. Therefore, in one embodiment, path weights may be used to rank the paths from network site 210a in decreasing order, such that network site 210b ranks highest followed by network sites 210d and 210c. Thus, when determining keywords to associate with network site 210a, keywords associated with network site 210b may be suggested before or may be priced higher than keywords associated with network sites 210c or 210d.

As noted above, the placement of advertising content may also be determined based on navigational paths or user trails. Thus, in some embodiments, an advertisement for network site 210b may be placed on one or more of the network sites near set 210b, such as network sites, 210a, 210c, 210e, 210f and/or 210g. Please note that for ease of discussion, the above examples indicate only network sites that are directly adjacent to a particular network site as near that network site. In other words, in the above example, a network site is proximate another network site if navigational pattern or user trail information indicates that users navigate from one of the network sites to the other network site. In other embodiments, however, other metrics or relationships between network sites may be utilized to determine a network site's proximity to another site. For example, network sites within a specified number of links within navigational pattern information 200 may be considered near each other. For example, in one embodiment, network sites that are within two link or "hops" may be considered near each other. Thus, in such an example, sites 210b, 210c, 210d, 210e, 210f, 210i and 210j may all be considered near network site 210a, since they are all within two hops of network site 210a.

Additionally, as described above, other metrics or techniques other than the number of hops between network sites, indicated by navigational pattern information, may used to determine whether two network sites are proximate each other. For example, in one embodiment, if two network sites are access by one or more users within a specified period of time the two sites may be considered near each other. Similarly, user quality, the presence of anchor links, the location of links, and other criteria may be used to determine a level of proximity between two sites.

Figure 3:
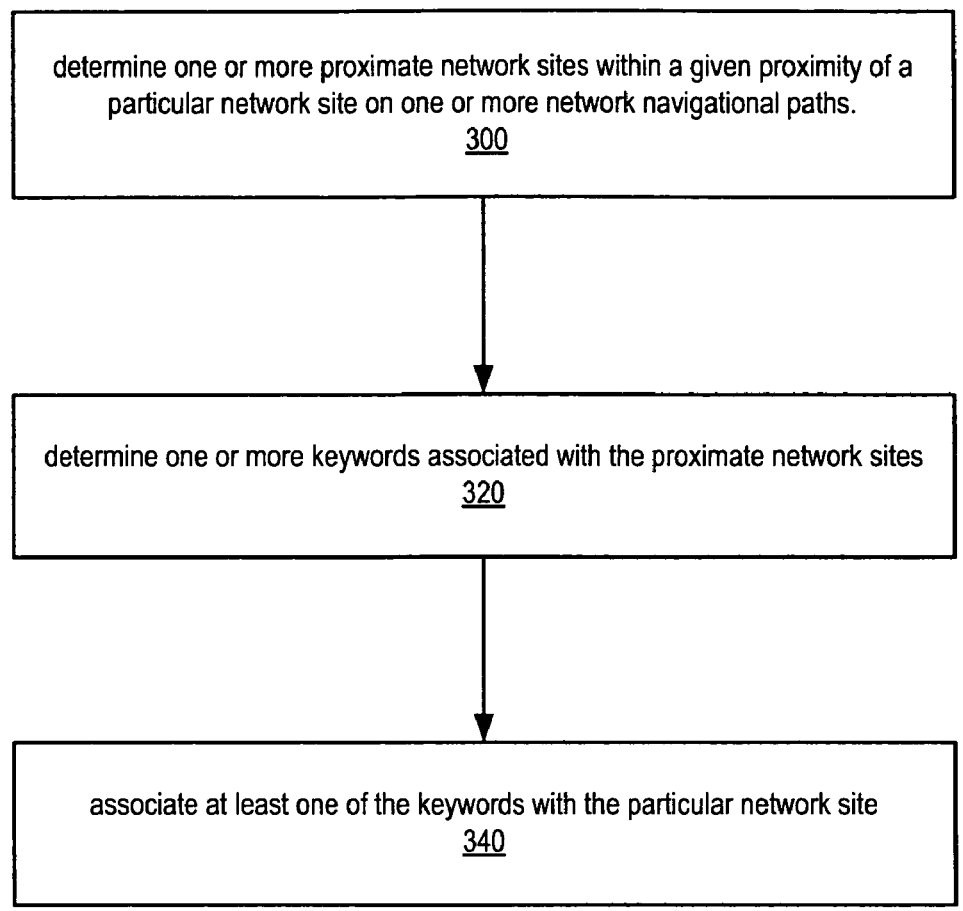
FIG. 3 is a flowchart illustrating one embodiment of a method for associating keywords with a particular network site based on network site near the particular network site.

FIG. 3 is a flowchart illustrating one embodiment of a method for associating keywords with a first network site based on network sites near the first network site. As described above, a publisher of a particular network site may seek to determine keywords to associate with the network site. Thus, in some embodiments, the publisher may desire to associate the particular network site with keywords that are associated with other sites on the same user trails as, and/or that are within a given proximity of, the particular network site As illustrated by block 300, an advertising broker system 190 may be configured to determine one or more proximate network sites within a given proximity of a particular network site on one or more network navigational paths. For example, in one embodiment, an advertising broker system may be configured to obtain traffic pattern information indicating sites within a given proximity to a particular network site, where the traffic pattern information indicates that a user navigated to/from each of the proximate network sites from/to the particular network site. As described above, navigational patterns or user trails may indicate that certain network sites are within a given proximity of other network sites according to user navigational paths. In one embodiment, an advertising broker system 190 may be configured to receive a request for suggested keywords for a particular network site and may, in response, communicate with a traffic pattern analysis system 130 to obtain traffic pattern information indicating one or more network sites near the particular network site. In other embodiments, however, advertising broker system 190 may be configured to collect and analyze network traffic pattern information itself to determine proximate network sites.

As described above, various criteria may be used to determine if one network site is within a given proximity of another, according to different embodiments. For example, in one embodiment, one network site may be considered proximate (i.e. within a given proximity of) a particular network site if a number of users access both sites within a specified amount of time. The time limit used to determine whether one site is within a given proximity of another may vary from embodiment to embodiment. For instance, two sites may be considered proximate each other if they are accessed within a certain number of seconds or minutes in one embodiment. While in another embodiment, two sites may be considered proximate if they are both accessed within a number of hours or days. In other embodiments, the number of links or hops along a navigational path or trail between the two sites, or alternatively, the average number of hops along several paths, may be used to determine whether they are within a given proximity. In yet other embodiments, the number of users visiting both sites, possibly with a specified amount of time or using only a specified number of hops, may be used to determine the proximity of two sits.

A number of sites may also be ranked according to how proximate they are to a particular network site. In general, any criteria used to determine whether two sites are within a given proximity may also be used to rank vary sites according to how near or proximate they are to a particular network site.

Additionally, the quality of the users visiting the network sites may be used both to determine whether one network site is within a given proximity of another site and/or to rank the relative proximity of various network sites. For instance, user profile information or characteristics of other sites visited by those users may be used to determiner or rank the quality of users visiting network sites. In one embodiment, a network site may be considered proximate a particular network site if the quality of users that visit the particular network site from the other site meet a certain criteria. For example, if the users also visited a number of sites related to luxury items or if they recently made a number of purchases, those users may be ranked higher in quality than other users. Thus, the quality of users that visit a particular site via certain network paths or that also visit other proximate sites may be used, at least in part, to determine the proximity of sites as well as the cost of keywords and/or placing advertising content.

In some embodiments, a publisher of the particular network site may obtain the network traffic pattern information indicating the proximate network sites, such as by using admin system 195 to request the information from either advertising broker system 190 or traffic pattern analysis system 130.

As indicated by block 320, advertising broker 190 may also be configured to determine one or more keywords associated with the proximate network sites. For example, the content of the proximate network sites may be obtained and analyzed to determine one or more keywords. In another embodiment, the keywords may be determined from metadata associated with the proximate network sites. In other embodiments, keywords may also be determined in other ways, such as by determining one or more search engine query terms associated with the proximate network sites. In general any method of determining keywords associated with the proximate network sites may be utilized, according to various embodiments.

Additionally, advertising broker 190 may be configured to associate at least one of the keywords with the particular network site, as illustrated by block 340. For instance, the keywords may be included in metadata for the particular network site in one embodiment. In another embodiment, the keywords may be associated with the particular network site by a search engine such that when one of the keywords is used as a query term in a search engine query the particular network site is included in the results of the query. In some embodiments, the publisher of the particular network site, or other controlling party or entity, may bid or pay for to have the keywords associated with the particular network site, such as to have a network site included in a search query result.

As noted above, in some embodiments, admin system 195 may be configured to perform the functions described above regarding FIG. 3. For example, rather than relying upon advertising broker system 190, admin system 195 may be configured to request proximate network sites from traffic pattern analysis system 130. In one embodiment, admin system 195 may then communicate information identifying the proximate network sites to advertising broker 190 requesting suggestion of keywords to associate with the particular network site. In another embodiment, however, admin system 195 may also be configured to determine keywords associated with the proximate network sites itself rather than requesting advertising broker 190 to suggest keywords.

Figure 4:
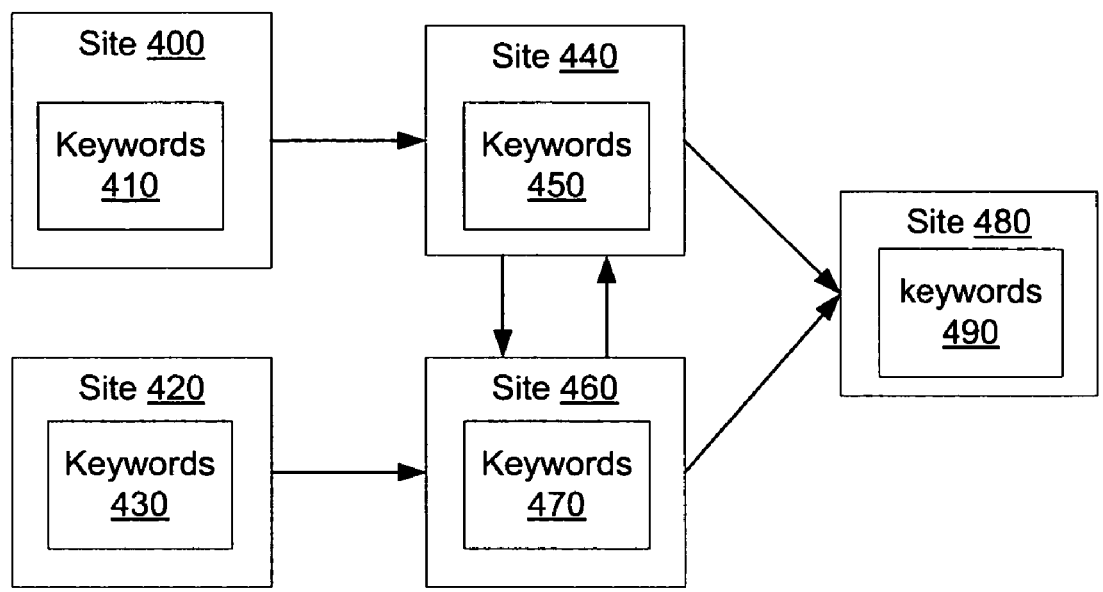
FIG. 4 is a block diagram illustrating a set of network sites with associated keywords, according to one embodiment.

FIG. 4 is a block diagram illustrating a set of network sites with associated keywords. As described above, keywords for proximate network sites may be suggested for association with another network site. Network traffic pattern information, such as navigational pattern information 200 may indicate a user trail from site 400 to site 440 and on to site 480. The traffic pattern information may also indicate a user trail from site 420 to site 460 and to site 480. As noted above, the proximity of network sites may be defined in various ways according to different embodiments. For instance, in one embodiment, sites 400 and 480 may be considered near or proximate site 440, but sites 400 and 480 may not be considered proximate each other. In other embodiments, however, sites 400 and 420 may be considered proximate site 480 and site 480 may be considered proximate sites 400 and 420.

For example, keywords 410 associated with network site 400 and keywords 490 associated with site 480 may be suggested for association with network site 440, such according to the method described above regarding FIG. 3. Similarly, keywords 450 associated with site 440 may be suggested for association with either site 400 or site 480, or both. In some embodiments, only keywords associated with a network site from which users navigate to a particular network site may be suggested for association with the particular network site. For instance, as indicated by the arrows between site 400 and 440, the traffic pattern information may indicate that users navigate from site 400 to site 440 but do not navigate from site 440 to site 400. Thus, in one embodiment, keywords 410 may be suggested for association with site 440, but keywords 450 may not be suggested for site 400. Similarly, keywords 430 and keywords 450 may be suggested for site 460 and keywords 450 and 470 may be suggested for site 490.

In other embodiments, any network site within two "hops" in any direction of a particular network site may be considered proximate the particular network site. Thus, in some embodiments, any of the keywords associated with any of sites 400, 420, 440, 460 and 480 may be suggested for any of the other network sites.

Figure 5:
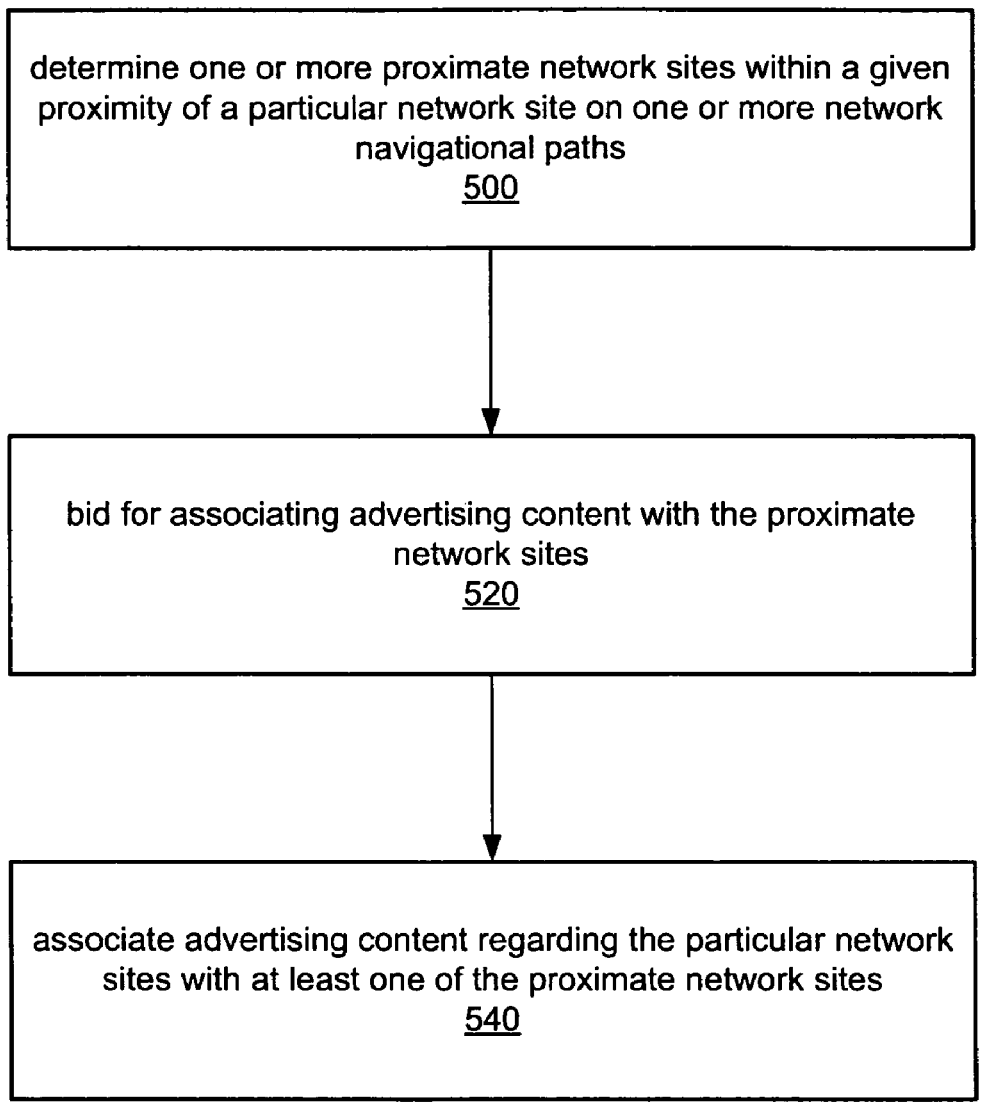
FIG. 5 is a flowchart illustrating a method for using user trail information to determine one or more network sites on which to place advertising content for another network site.

FIG. 5 is a flowchart illustrating a method for using user trail information to determine one or more network sites on which to place advertising content for another network site. As described above, an advertisement for a particular network site or other network resource may be placed on network site from which users navigate to the particular network site or resource. For example, as indicated by block 500, an advertising broker may determine one or more proximate network sites within a given proximity of a particular network site on one or more network navigational paths. For instance, advertising broker system 190 may be configured to obtain traffic pattern information indicating network sites near a particular network site, where the traffic pattern information indicates that a user navigated to/from each of the proximate network sites from/to the particular network site.

As described above regarding FIG. 3, various criteria may be used to determine if one network site is within a given proximity of another, according to different embodiments. In general any of the criteria described above regarding determining whether a network site is within a given proximity of another site or for ranking the relative proximity of sites may be also be used when bidding on or associating advertising content with network site.

As indicated by block 520, a publisher for the particular network site may bid for associating advertising content with the proximate network sites determined at block 500. For example, advertising broker 190 may be configured to sell advertising space on the proximate network sites and the publisher of the particular network site may take part in an auction to place advertising content on the proximate network site. As will be discussed in more detail below, the price that a publisher may be willing to pay, or bid, for placing advertising content may be based, at least in part, on various information determined from user trails. For example, advertising content placed on network sites that are nearer to the advertised network site (as determine by any of various criteria) may be more expensive than advertising content placed on network sites that are further away from the advertised network site. Similarly, advertising content placed on network sites from which more traffic navigates to the advertised network site, whether directly or indirectly, may be more expensive than less network sites with less volume of traffic navigating to the advertised network sites.

Advertising broker 190 may also be configured to associate advertising content regarding the particular network site on at least one of the proximate network sites, as indicated by block 540. Thus, ads for a network site may be placed on frequently used user trails to the advertised network site. Advertisements or advertising content may be placed on network site in any number of manners, according to different embodiments. For example, in one embodiment, a banner add may be placed in the content of a proximate network site. In another embodiment, a descriptive link to the advertised network site maybe placed on or may be associated with a proximate network site. In yet another embodiment, an advertisement for the advertised web site may be placed in a side bar of a web page that displays search results including the proximate site. For example, if navigational path information indicates that a large number of users navigate from a network site regarding a boat rental service to a network site regarding a fishing guide service, an advertisement for the fishing guide service site may be placed on the boat rental service site or on a search engine results page that includes the fishing guide service site, according to different embodiments.

Figure 6:
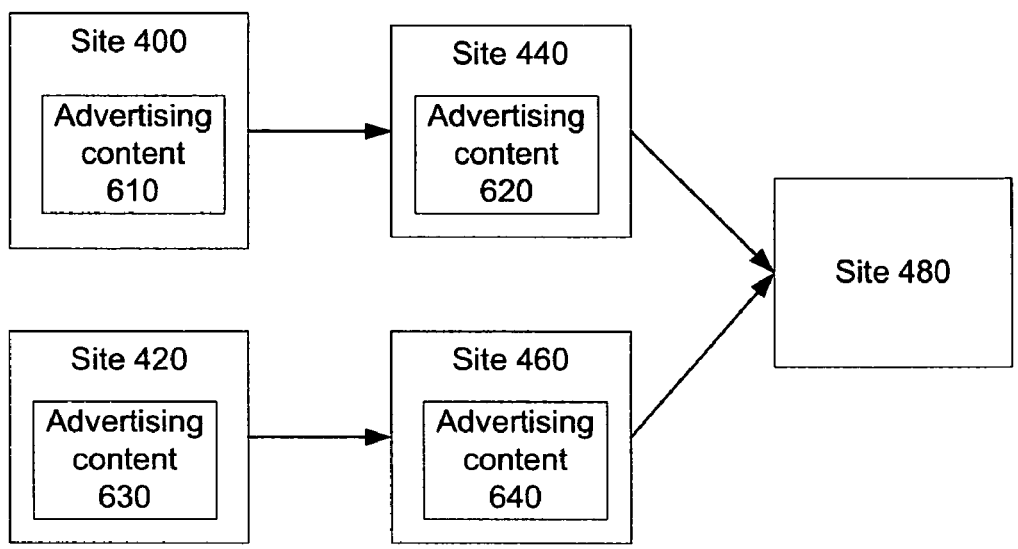
FIG. 6 is a block diagram illustrating advertising content placed on network sites as described herein and according to one embodiment.

FIG. 6 is a block diagram illustrating advertising content placed on network sites as described herein. As illustrated in FIG. 6, network traffic pattern information may indicate a user trail from site 400 to site 440 and on to site 480. Similarly, the network traffic pattern information may indicate a user trail from site 420 to site 460 to site 480. As described above, a publisher of site 480 may seek to place advertising on network sites from which users navigation to site 480. Thus, network traffic pattern information may be obtained to determine one or more sites proximate site 480 from which users navigate to site 480, such as sites 440 and 460. Thus, advertising content 620 and 640 for site 480 may be placed on sites 440 and 460, respectively, such as according to the method described above regarding FIG. 5. Similarly, advertising content for site 440 may be placed on site 440 and advertisements for site 460 may be placed on site 420.

In some embodiments, however, advertisements may also be placed on sites to which users navigate from the network site to be advertised, as described above. For instance, advertising content 620 for site 400 may be placed on site 440 and advertisement 640 for site 420 may be placed on site 460. In general, advertising content for a particular network site may be placed on network sites that are proximate, and on the same user trails as, the particular network site.

As noted above, the cost of advertising may be based, as at least in part, on information regarding user trails. For example, advertising content placed on network sites that are more proximate or nearer the advertised network site may be more expensive than advertising content placed on network sites that are less proximate or further from or less proximate the advertised network site. Similarly, it may be more expensive to place advertising content on a proximate network site from which a large number of users navigate to the advertised network site. FIG. 7 is a flowchart illustrating one embodiment of a method for determining advertising pricing. In order to determine pricing for advertising, the network site proximate a particular network site may be ranked according any of various measures related to navigational path information. For instance, as illustrated by block 700, proximate network sites may be ranked according to the amount of user traffic that navigates to a particular network site from each proximate network site. Thus, referring back to FIG. 2, if more users navigate from site 210*d* to 210*j* than from 210*i* to 210*j*, site 210*d* may be ranked higher than site 210*i*.

In other embodiments, proximate network sites may be ranked by other user trail related criteria, such as the number of hops between two sites or the amount of time between a user accessing two sites, among other criteria. Still referring back to FIG. 2 for example, when ranking sites proximate network site 210*f*, sites 210*b*, 210*c*, and 210*e* may be ranked higher than site 210*a*. In some embodiments, sites from which users navigate to a particular site may be ranked higher than sites to which users navigate from the particular site. For example, when ranking sites proximate site 210*c*, site 210*a* may be ranked higher than sites 210*b* or 210*e*, according to one embodiment. In other embodiments, the reverse may be true and sites 210*b* and 210*e* may be ranked higher than site 210*a*. Thus, as indicated by block 720, advertising pricing for placing advertising content on one of the proximate network sites may be determined according to the ranking of each proximate site. For example, when determining pricing for placing advertisements for site 210*e*, placing an advertisement on site 210*c* may be more expensive than placing an advertisement on site 210*a*.

While described above mainly in reference to placing advertising on a network site, the method of FIG. 7 also applies to the use of suggested keywords. For example, when associating a keyword with network site 210*e* for the purposed of including site 210*e* in the results of a search query that includes that keyword, associating keywords from site 210*c* with site 210*e* may be more expensive than associating keywords from site 210*a*. Similarly, when bidding to have site 210*e* displayed higher in a list of search results, the publisher of site 210*e* may be willing to bid more for to have site 210*e* associated with keyword from site 210*c* than for keywords from site 210*a*.

Please note that in some embodiments, the determination of a bid price and the placing of a bid for associating a network site may be performed automatically, or semi-automatically by an application or computer system, such as admin system 195. For example, admin system 195 may be configured to take part in an auction for associating keyword with a network site, such as site 210*e*. Admin system 195 may also include a user interface allowing a person, such as a publisher of a network site, to control the bidding. Admin system 195 may be configured to determine keywords associated with network sites proximate site 210*e* on various user trails or other navigational paths and to rank the proximate network sites according to any of various navigational path characteristic. For instance, in some embodiments, admin system 195 may be configured to rank the proximate network sites according to how near they are to site 210*e*, as in the example above. Thus, admin system 195 may automatically determine how much to bid for such keywords based on the ranking of the proximate network sites. For instance, admin system 195 may be configured to automatically bid relatively higher for keywords associated with a network site that is nearer to site 210e. In other embodiments, admin system 195 may be configured to rank and determine pricing according to other user trail criteria. For example, admin system 195 may be configured to bid more for keywords associated with network sites from which users navigate to site 210e than for keywords associated with network sites to which users navigate from site 210e.

In some embodiments, admin system 195 may include a user interface allowing the user to specify aspects of the bidding process, such as a maximum bid or to confirm the final bid price before the bid is actually placed. Thus, while admin system 195 may determine a bid value or advertising cost, a user may, in some embodiments, be able to control some (or all) aspects of the process. Additionally, an application, such may be executing on admin system 195 may also be configured to charge the determined advertising cost, either as part of a completed auction or as part of a non-auction sale or lease for associating advertising content, such as placing an advertisement or link on a network site.

Similarly, admin system 195 may be configured to automatically bid for placing advertising content on proximate network sites. Thus, according to some embodiments, advertising pricing may be determined, at least in part, on user trail and/or navigational path criteria.

Figure 8:
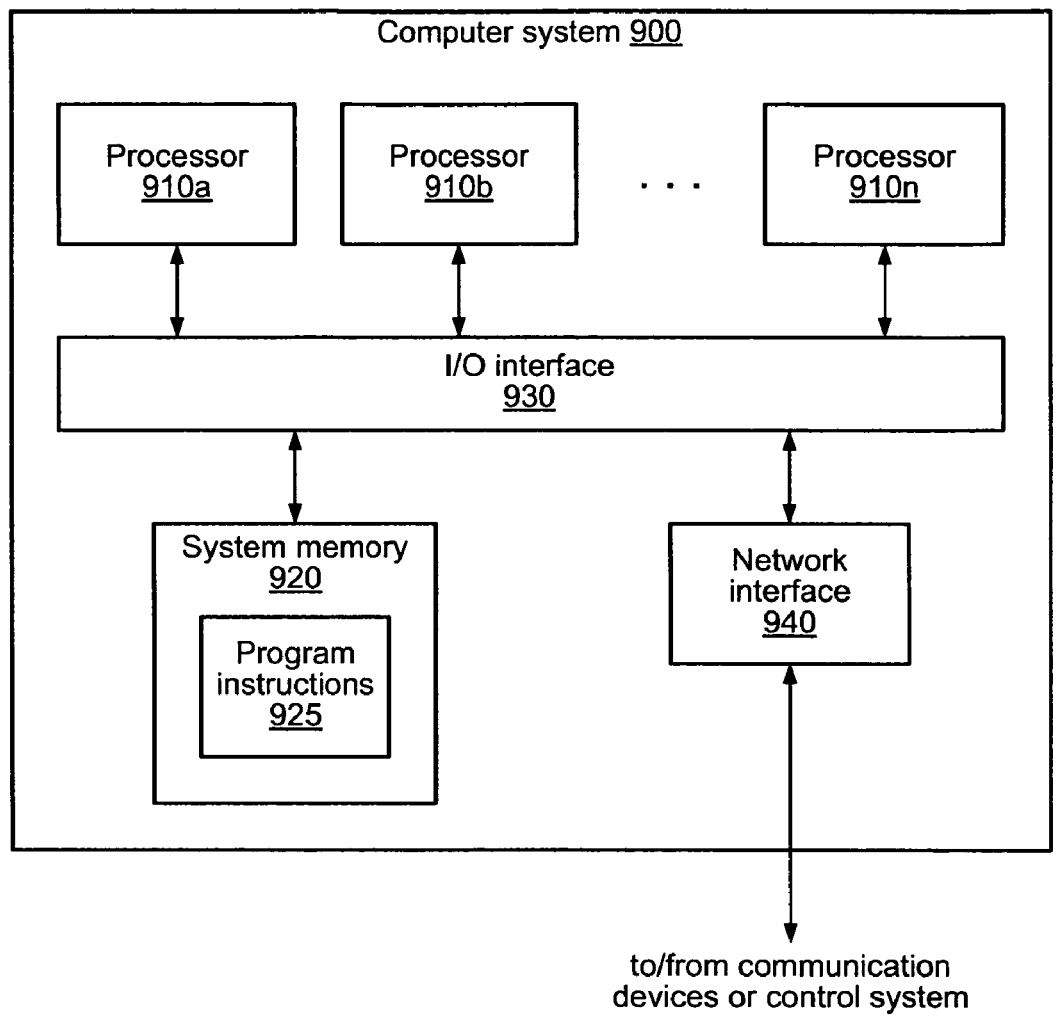
FIG. 8 is a block diagram illustrating an embodiment of a computer system usable to utilize navigational paths and/or user trails for advertising placement.

FIG. 8 is a block diagram illustrating an embodiment of a computer system usable to utilize navigational paths and/or user trails for advertising placement. In one embodiment, an advertising broker, such as advertising broker system 190, a traffic pattern analysis system 130 or an admin system 195, all illustrated in FIG. 1, may include a general-purpose computer system that includes or is configured to access one or more computer-accessible media, such as computer system 900 illustrated in FIG. 8.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of advertising broker system 190, traffic pattern analysis system 130 and/or admin system 195, while in other embodiments systems 130, 190, and 195 may include elements in addition to computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for system 190, system 130 and/or system 195, are shown stored within system memory 920 as code 925.

In one embodiment, I/O interface 930 may be configured to coordinate I/O traffic between processor 910, system memory 920 and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer system described above. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 9220 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-readable, storage medium. Generally speaking, a computer-readable, storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a processor; and
    a memory coupled to the processor, wherein the memory comprises program instructions executable by the processor to:
        determine one or more proximate network sites within a given proximity of a particular network site on one or more network navigation paths, wherein the one or more proximate network sites are determined dependent upon user network traffic generated by a plurality of users visiting the particular network site from other network sites, wherein the given proximity of a given network site is determined dependent on one or more of the following characteristics of the user network traffic: a quantity or type of the plurality of users visiting the particular network site from the given network site, a number of intermediate network sites visited by one or more users between the given network site and the particular network site, or an amount of time elapsed between one or more users visiting the given network site and visiting the particular network site;
        determine one or more keywords associated with the one or more proximate network sites, wherein to determine one or more keywords associated with the proximate network sites, the program instructions are further executable to perform at least one of:
            analyze content of the one or more proximate network sites;
            determine one or more search engine query terms associated with the one or more proximate network sites; or
            determine one or more keywords associated with the proximate network sites from an a keyword association store maintained by an advertising brokerage service; and
        associate at least one of the keywords with the particular network site.

2. The system of claim 1, wherein to associate the at least one of the keywords, the program instructions are further executable to bid on the at least one of the keywords in an auction for placement of an advertisement for the particular network site in results of a search provided by a search engine.

3. The system of claim 1, wherein to associate the at least one of the keywords, the program instructions are further executable to suggest the at least one keyword.

4. The system of claim 3, wherein the program instructions are further executable to suggest the at least one keyword in response to a request for keywords to associate with the particular network site.

5. The system of claim 1, wherein to determine the one or more proximate network sites, the program instructions are further executable to analyze one or more usage logs for one or more users that accessed one or more of the plurality of network sites.

6. The system of claim 1, wherein to obtain network navigation path information for use in determining the one or more proximate network sites, the program instructions are further executable to receive user navigation information from a plurality of network browsers.

7. The system of claim 1, wherein the program instructions are further executable to rank the one or more proximate network sites according to a number of users that navigate from each respective proximate network site to the particular network site as compared to a number of users that navigate from others of the proximate network sites to the particular network site.

8. The system of claim 1, wherein to determine one or more keywords associated with the proximate network sites, the program instructions are further executable to analyze content of the one or more proximate network sites.

9. The system of claim 1, wherein to determine one or more keywords associated with the proximate network sites, the program instructions are further executable to determine one or more search engine query terms associated with the one or more proximate network sites.

10. The system of claim 1, wherein to determine one or more keywords associated with the proximate network sites, the program instructions are further executable to determine one or more keywords associated with the proximate network sites from an a keyword association store maintained by an advertising brokerage service.

11. The system of claim 1, wherein the program instructions are executable to determine that a respective one of the proximate network sites is within said given proximity of the particular network site if the characteristics of the user network traffic indicate that at least one user accessed the respective proximate network site and the particular network site within a specified amount of time.

12. The system of claim 1, wherein the program instructions are executable to determine that a respective one of the proximate network sites is within said given proximity of the particular network site if the characteristics of the user network traffic indicate that less than a specified number of links were used to access the particular network site from the respective proximate network site.

13. The system of claim 1, wherein the program instructions are executable to determine that a respective one of the proximate network sites is within said given proximity of the particular network site if the characteristics of the user network traffic indicate that more than a specified number of users visited both the respective network site and the particular network site.

14. The system of claim 1, wherein the program instructions are executable to determine that a respective one of the proximate network sites is within said given proximity of the particular network site if the characteristics of the user network traffic indicate that an average number of links used to access the particular network site from the respective network site is less than a specified number.

15. A computer-implemented method, comprising:
    determining one or more proximate network sites within a given proximity of a particular network site on one or more network navigation paths, wherein said determining is dependent upon user network traffic generated by a plurality of users visiting the particular network site from other network sites, wherein the given proximity of a given network site is determined dependent on one or more of the following characteristics of the user network traffic: a quantity or type of the plurality of users visiting the particular network site from the given network site, a number of intermediate network sites visited by one or more users between the given network site and the particular network site, or an amount of time elapsed between one or more users visiting the given network site and visiting the particular network site;

determining one or more keywords associated with the one or more proximate network sites, wherein to determine one or more keywords associated with the proximate network sites, the program instructions are further executable to perform at least one of:

analyze content of the one or more proximate network sites;

determine one or more search engine query terms associated with the one or more proximate network sites; or determine one or more keywords associated with the proximate network sites from an a keyword association store maintained by an advertising brokerage service; and associating at least one of the one or more keywords with the particular network site.

16. The method of claim 15, wherein said associating comprises bidding on the at least one of the keywords in an auction for placement of an advertisement for the particular network site in results of a search provided by a search engine.

17. The method of claim 15, wherein said associating comprises an advertising broker system suggesting the at least one keyword.

18. The method of claim 17, wherein said suggesting is in response to a request for suggested keywords from a publisher of the particular network site.

19. The method of claim 15, wherein determining the one or more proximate network sites comprises analyzing one or more usage logs for one or more users that accessed one or more of the plurality of network sites.

20. The method of claim 15, further comprising obtaining network navigation path information for use in said determining the one or more proximate network sites, wherein said obtaining comprises receiving user navigation information from a plurality of network browsers.

21. The method of claim 15, further comprising ranking the one or more proximate network sites according to a number of users that navigate from each respective proximate network site to the particular network site as compared to a number of users that navigate from others of the proximate network sites to the particular network site.

22. The method of claim 15, wherein said determining one or more keywords associated with the proximate network sites comprises analyzing content of the one or more proximate network sites.

23. The method of claim 15, further comprising a plug-in installed in a network browser application detecting a user's navigation from one of the proximate sites to the particular network site.

24. The method of claim 15, wherein said determining one or more keywords associated with the proximate network sites comprises determining one or more search engine query terms associated with the one or more proximate network sites.

25. The method of claim 15, wherein said determining one or more keywords associated with the proximate network sites comprises determining one or more keywords associated with the proximate network sites from an a keyword association store maintained by an advertising brokerage service.

26. The method of claim 15, further comprising determining that a respective one of the proximate network sites is within said given proximity of the particular network site if the characteristics of the user network traffic indicate that at least one user accessed at the respective proximate network site and the particular network site within a specified amount of time.

27. The method of claim 15, further comprising determining that a respective one of the proximate network sites is within said given proximity of the particular network site if the characteristics of the user network traffic indicate that a number of links used to access the particular network site from the respective proximate network site is less than a specified number.

28. The method of claim 15, further comprising determining that a respective one of the proximate network sites is within said given proximity of the particular network site if the characteristics of the user network traffic indicate that more than specified number of users visited both the respective network site and the particular network site.

29. The method of claim 15, further comprising determining that a respective one of the proximate network sites is within said given proximity of the particular network site if the characteristics of the user network traffic indicate that an average number of links used to access the particular network site from the respective network site is less than a specified number.

30. A computer-readable non-transitory storage medium, comprising program instructions executable to implement:

determining one or more proximate network sites within a given proximity of a particular network site on one or more network navigation paths, wherein said determining is dependent upon user network traffic generated by a plurality of users visiting the particular network site from other network sites, wherein the given proximity of a given network site is determined dependent on one or more of the following characteristics of the user network traffic: a quantity or type of the plurality of users visiting the particular network site from the given network site, a number of intermediate network sites visited by one or more users between the given network site and the particular network site, or an amount of time elapsed between one or more users visiting the given network site and visiting the particular network site;

determining one or more keywords associated with the one or more proximate network sites, wherein to determine one or more keywords associated with the proximate network sites, the program instructions are further executable to perform at least one of:

analyze content of the one or more proximate network sites;

determine one or more search engine query terms associated with the one or more proximate network sites; or determine one or more keywords associated with the proximate network sites from an a keyword association store maintained by an advertising brokerage service; and associating at least one of the keywords with the particular network site.

31. The medium of claim 30, wherein said associating comprises bidding on the at least one of the keywords in an auction for placement of an advertisement for the particular network site in results of a search provided by a search engine.

32. The medium of claim 30, wherein associating comprises suggesting the at least one keyword to a publisher of the first web site.

33. The medium of claim 32, wherein the program instructions are further executable to implement said suggesting in response to a request for keywords to associate with the particular network site.

34. The medium of claim 30, wherein determining the one or more proximate network sites comprises analyzing one or more usage logs for one or more users that accessed one or more of the plurality of network sites.

35. The medium of claim 30, wherein the program instructions are further executable to implement obtaining network navigation path information for use in said determining the one or more proximate network sites, where said obtaining comprises receiving user navigation information from a plurality of network browsers.

36. The medium of claim 30, wherein the program instructions are further executable to implement ranking the one or more proximate network sites according to a number of users that navigate from each respective proximate network site to the particular network site as compared to a number of users that navigate from others of the proximate network sites to the particular network site.

37. The medium of claim 30, wherein said determining one or more keywords associated with the proximate network sites comprises analyzing the content of the one or more proximate network sites.

38. The medium of claim 30, wherein determining one or more keywords associated with the proximate network sites comprises determining one or more search engine query terms associated with the one or more proximate network sites.

39. The medium of claim 30, wherein determining one or more keywords associated with the proximate network sites comprises determining one or more keywords associated with the proximate network sites from a keyword associations store maintained by an advertising brokerage service.

40. The medium of claim 30, wherein the program instructions are further executable to implement determining that a respective one of the proximate network sites is within a given proximity of the particular network site if the characteristics of the user network traffic indicate that at least one user accessed the respective proximate network site and the particular site within a specified amount of time.

41. The medium of claim 30, wherein the program instructions are further executable to implement determining that a respective one of the proximate network sites is within a given proximity of the particular network site if the characteristics of the user network traffic indicate that less than a specified number of links were used to access the particular network site from the respective proximate network site according to network traffic information.

42. The medium of claim 30, wherein the program instructions are further executable to implement determining that a respective one of the proximate network sites is within a given proximity of the particular network site if the characteristics of the user network traffic indicate that more than a specified number of users visited both the respective network site and the particular network site according to network traffic information.

43. The medium of claim 30, wherein the program instructions are further executable to implement determining that a respective one of the proximate sites is within said given proximity of the particular network site if the characteristics of the user network traffic indicate that an average number of links used to access the particular network site from the respective network site is less than a specified number according to network traffic information.

* * * * *